(12) United States Patent
Fröhlich et al.

(10) Patent No.: US 7,961,999 B2
(45) Date of Patent: Jun. 14, 2011

(54) OPTICAL WAVEGUIDE DISTRIBUTION DEVICE

(75) Inventors: Franz-Friedrich Fröhlich, Hagen (DE); Gerhard Feiler, Hagen (DE); Keith Sullivan, Hildenborough (GB)

(73) Assignee: CCS Technology, Inc., Wilmington, DE (US)

( * ) Notice: Subject to any disclaimer, the term of this patent is extended or adjusted under 35 U.S.C. 154(b) by 8 days.

(21) Appl. No.: 11/921,721

(22) PCT Filed: May 20, 2006

(86) PCT No.: PCT/EP2006/004807

§ 371 (c)(1),
(2), (4) Date: Apr. 27, 2009

(87) PCT Pub. No.: WO2006/133787

PCT Pub. Date: Dec. 21, 2006

(65) Prior Publication Data

US 2009/0269018 A1    Oct. 29, 2009

(30) Foreign Application Priority Data

Jun. 11, 2005    (DE) .................... 20 2005 009 182 U

(51) Int. Cl.
G02B 6/44    (2006.01)

(52) U.S. Cl. ........................................ 385/135
(58) Field of Classification Search ............... 385/135
See application file for complete search history.

(56) References Cited

U.S. PATENT DOCUMENTS

| 4,824,196 | A  | * | 4/1989 | Bylander ............... 385/134 |
| 5,142,607 | A  | * | 8/1992 | Petrotta et al. ......... 385/135 |
| 5,511,144 | A  |   | 4/1996 | Hawkins et al. ........ 385/135 |
| 7,526,171 | B2 | * | 4/2009 | Caveney et al. ........ 385/135 |
| 2005/0111809 | A1 | * | 5/2005 | Giraud et al. ........... 385/135 |

FOREIGN PATENT DOCUMENTS

| EP | 0490609 A2 | 12/1991 |
| EP | 0 585 809 A1 * | 8/1993 |
| EP | 0585809 A1 | 8/1993 |
| EP | 0538164 B1 | 10/1993 |
| EP | 0288208 B1 | 2/1996 |

* cited by examiner

Primary Examiner — Michelle R Connelly Cushwa
(74) Attorney, Agent, or Firm — John H. Vynalek

(57) ABSTRACT

There is disclosed an optical waveguide distribution device having a distribution panel with splice cassettes removably connected thereto. Fiber optic splices are placed within the splice cassettes, so that removal of the splice cassettes allows improved access to the splices. In addition, the distribution panel includes a front wall upon which are positioned a plurality of couplings. The front wall is removably connected to the distribution panel to allow improved access to the couplings.

9 Claims, 3 Drawing Sheets

OPTICAL WAVEGUIDE DISTRIBUTION DEVICE

BACKGROUND OF THE INVENTION

1. Field of the Invention

The invention relates to an optical waveguide distribution device having at least one splice cassette and a plurality of couplings.

2. Technical Background

For example, in distribution cabinets for optical cables, distribution devices are used that are known from the product catalog "Accessories for OWG-cable networks, issue 2, page 227, year 2002, Corning Cable Systems GmbH & Co. KG". The optical, waveguide distribution device shown there comprises a distribution panel which is mounted or stored in a tray-like manner in a frame or a housing, the distribution panel having a front wall, a rear wall, two side walls extending between the front wall and the rear wall, and a base wall. In the region of the front wall of the distribution panel, couplings are positioned which are formed both on an outer side of the front wall and an inner side of the front wall, so that plugs of optical waveguides can be inserted into the couplings starting both from the outer side of the front wall and from the inner side of the front wall. In such an optical waveguide distribution device, it is usual for optical waveguides, which are prefabricated at one end with a plug, to be inserted into the couplings via the plug from the inner side of the of the front wall, free ends of these optical waveguides being placed in at least one splice cassette of the distribution panel. An optical cable with further optical waveguides can be introduced into the distribution device via the rear wall of the distribution panel, it being possible to splice the optical waveguides of the optical cable with the waveguides which are inserted into the couplings of the front wall via plugs from the inner side. Splices formed between these optical waveguides are placed in a splice cassette, which, according to prior art, is connected to the base wall of the distribution panel. If splices are to be formed between optical waveguides that are to be connected to each other in such an optical waveguide distribution device, it has proved to be problematic that the optical waveguides are relatively badly accessible for splicing work, which is especially the case when a plurality of splice cassettes are stacked one above the other in the distribution panel.

SUMMARY OF THE INVENTION

Against this background, the present invention is based on the problem of providing a novel optical waveguide distribution device.

This problem is solved by an optical waveguide distribution device having the features of claim 1.

According to the invention, the or each splice cassette is removably connected with the distribution panel, the or each splice cassette being able to be placed on the front wall of the distribution panel, and the front wall of the distribution panel also being removably connected to the same in such a manner accommodated that the front wall can be displaced or repositioned relative to the distribution panel together with the or each splice cassette by the front wall and the splices placed in the or each splice cassette.

For the purpose of the present invention, it is suggested to removably connect the or each splice cassette and the front wall to the distribution panel, so that the front wall, together with the or each splice cassette accommodated in the region of the front wall, can be displaced or repositioned relative to the distribution panel. It can thereby be ensured, that the optical waveguides are more easily accessible for splicing work.

Preferably, the front wall of the distribution panel, on which the couplings are positioned, has holding elements on a top edge, in order to accommodate the or each splice cassette.

BRIEF DESCRIPTION OF THE DRAWINGS

Preferred developments of the invention follow from the subclaims and the description below. Exemplary embodiments will be explained in more detail using the drawing, in which:

DETAILED DESCRIPTION OF THE INVENTION

The present invention will be described in greater detail below with reference to FIGS. 1 to 3.

Figure 1:
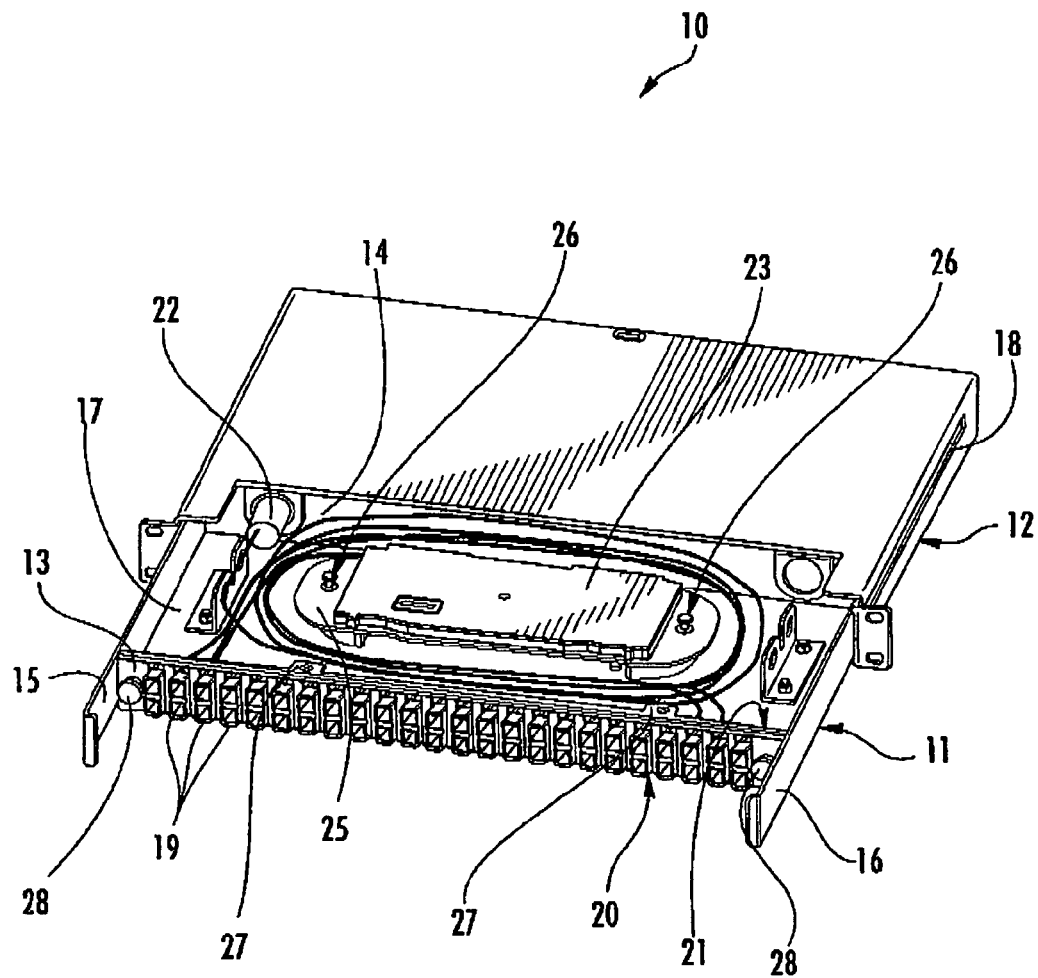
FIG. 1 shows a perspective side view of an optical waveguide distribution device for the purpose of the present invention.
Figure 2:
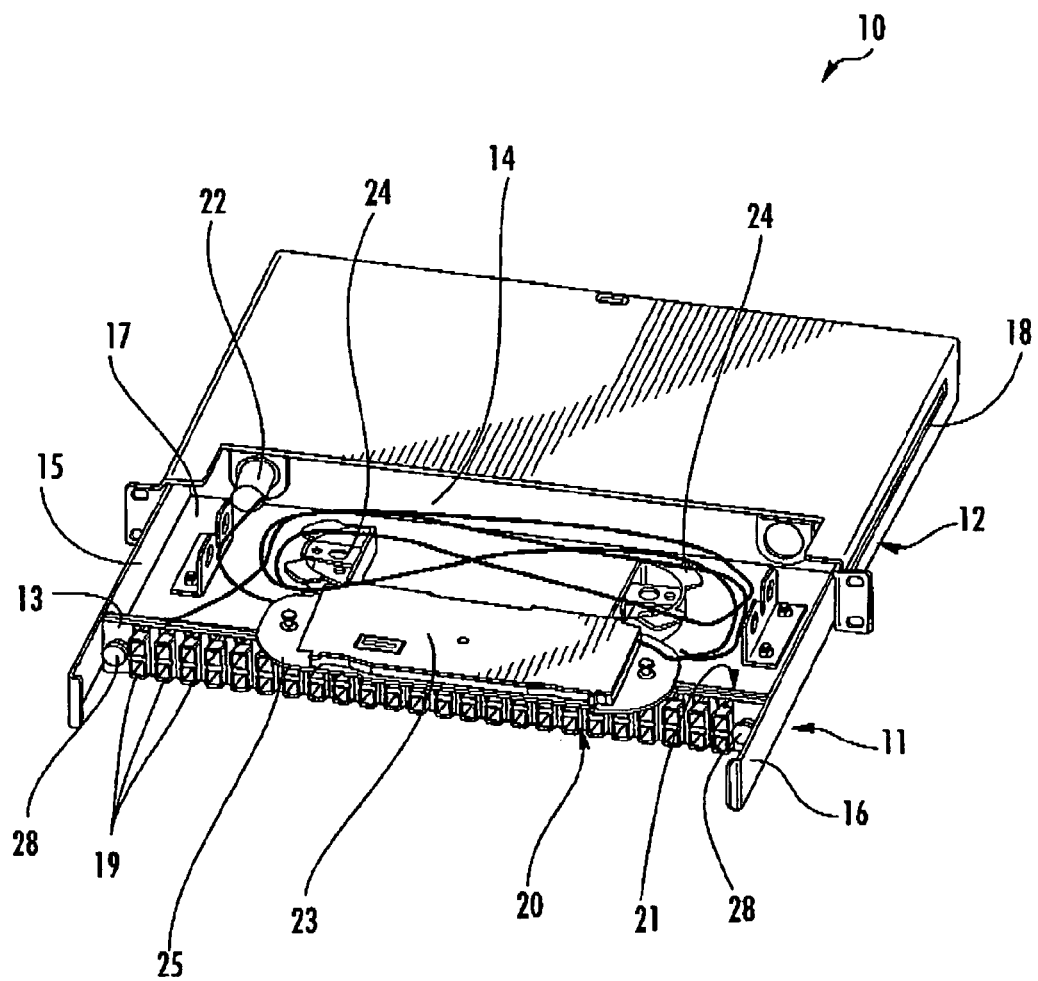
FIG. 2 shows the optical waveguide distribution device according to the invention of FIG. 1 with a splice cassette which has been displaced in comparison with FIG. 1.
Figure 3:
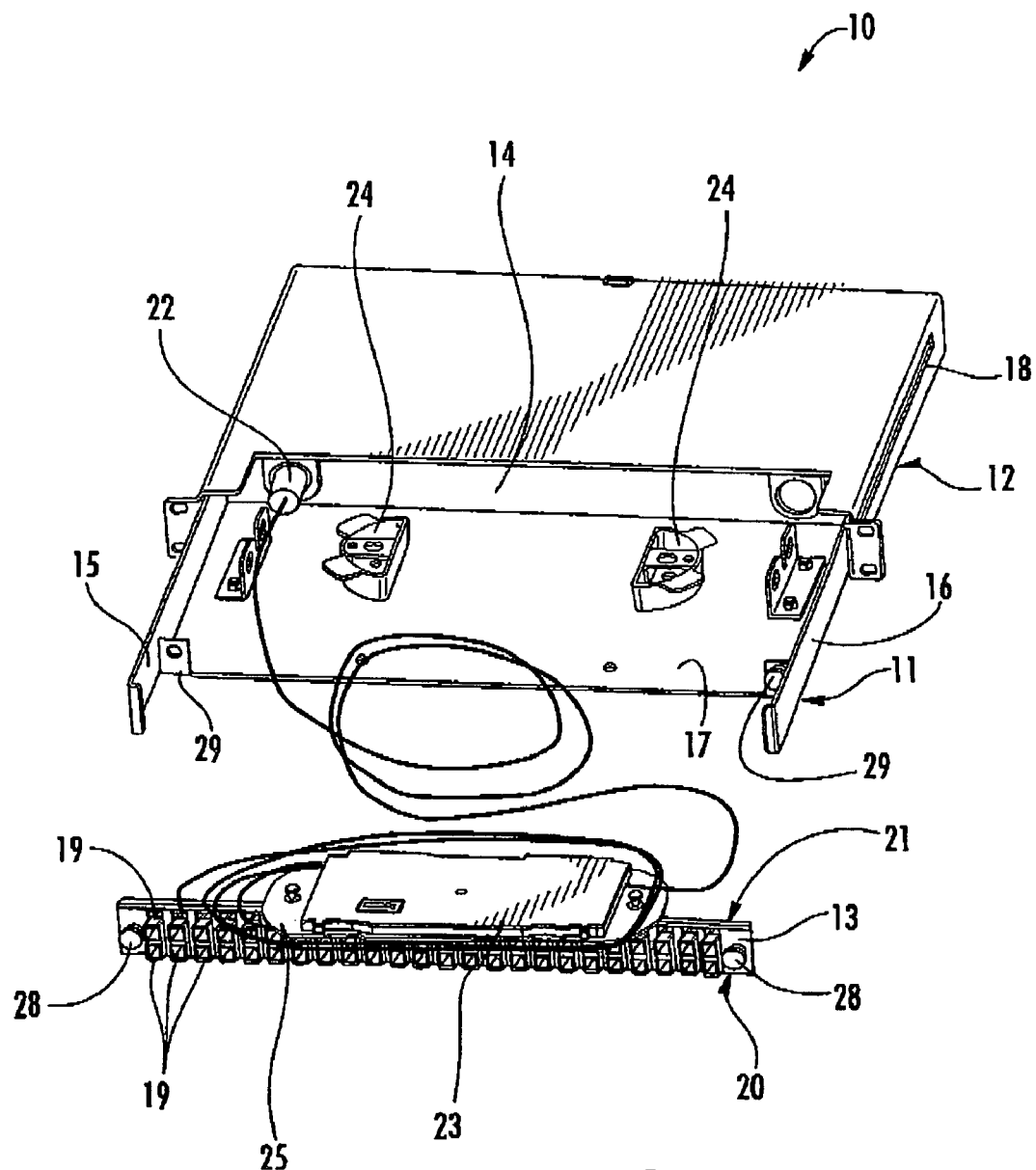
FIG. 3 shows the optical waveguide distribution device according to the invention of FIGS. 1 and 2 with a splice cassette which has been displaced in comparison with FIGS. 1 and 2 and a front wall which has also been displaced.

FIGS. 1 to 3 show an optical waveguide distribution device 10 according to the invention comprising a distribution panel 11, which is mounted in a tray-like manner in a frame or a housing 12. The distribution panel 11 comprises a front wall 13, a rear wall 14, side walls 15 and 16 extending between the front wall 13 and the rear wall 14, and a base wall 17. The entire distribution panel 11 can be pulled out of the housing 12 in the manner of a drawer, the guidance of this drawer-like relative movement between the distribution panel 11 and the housing 12, being served by assigning to the side walls 15 and 16 of the distribution panel 11 guide pins (not illustrated) which engage in guide grooves 18 of the housing 12, the guide grooves 18 of the housing 12 extending approximately parallel to the side walls 15 and 16 of the distribution panel 11.

A plurality of couplings 19 are assigned to the front wall 13 of the distribution panel 11, the couplings 19 being formed both in the region of an outer side 20 of the front wall 13 and in the region of an inner side 21 of the front wall 13. Plugs of prefabricated optical waveguides can be introduced into the couplings 19 formed in the region of the outer side 20 as well as of the inner side 21 of the front wall 13, such optical waveguides prefabricated with connectors being referred to as "pigtails" or "patch cords."

In the exemplary embodiment shown in FIGS. 1 to 3, plugs of the first optical waveguides, designed as pigtails, are inserted into the couplings 19 positioned in the region of the inner side 21 of the front wall 13, these first optical waveguides being designed without a plug at an end opposite the connector plugs. An optical cable 22 with a plurality of second optical waveguides can be introduced into such an optical waveguide distribution device 10 via the rear wall 14, the second optical waveguides of the optical cable 22 being spliced with the free ends of the first optical waveguides, which, at their opposite ends, are inserted into couplings 19 formed on the inner side 21 of the front wall 13 via plugs. Splices formed in this manner are placed in at least one splice cassette 23 of the distribution panel 11, excess lengths of the second optical waveguides of the optical cable 22 being placed in the region of an excess length store, formed by guiding elements 24 of the distribution panel 11. In the exemplary embodiment of FIGS. 1 to 3, only one splice cassette 23 is shown, but the optical waveguide distribution device 10 according to the invention or the distribution panel 11 may also have a plurality of splice cassettes 23 stacked one above the other.

For the purpose of the present invention, it is suggested that the splice cassette 23 is removably connected to the distribution panel 11, to be precise, in such a manner that the splice cassette 23 can be displaced or repositioned relative to the distribution panel 11 together with the splices placed in the splice cassette 23. In the exemplary embodiment shown, the splice cassette 23, or a stack of splice cassettes 23, is stored on or fixed to a carrier plate 25, it being possible for the splice cassette 23 together with the carrier plate 25 to be displaced or repositioned relative to the distribution panel 11. For this purpose, the carrier plate 25 is assigned locking elements 26, via which the carrier plate 25 and thus the splice cassette 23 is anchored or removably connected in the position illustrated in FIG. 1 to the guiding elements 24 in the region of the base wall 17 of the distribution panel 11. The locking elements 26 are preferably designed in this case as so-called push/pull locks.

After opening of the locks 26, the carrier plate 25, together with the or each splice cassette 23 fixed to the carrier plate 25, can be repositioned relative to the distribution panel 11, to be precise in such a manner that the carrier plate 25 and thus the or each splice cassette 23 can be fitted onto the front wall 13 of the distribution panel 11. For this purpose, the front wall 13 of the distribution panel 11 has holding elements 27 in the region of a top edge; said holding elements 27 interact with the locking elements 26 in order to accommodate the carrier plate 25 in the region of the front wall 13.

After removing the or each splice cassette 23 from the position shown in FIG. 1, it therefore serves the purpose of the present invention to move the or each splice cassette into the position shown in FIG. 2 and in so doing placing it in the region of the front wall 13 of the distribution panel 11. Consequently, the excess lengths of the second optical waveguides of the optical cable 22 are easily or well accessible, said excess lengths being led to or placed in the region of the excess length store formed by the guiding elements 24.

For the purpose of the present invention, the front wall 13 of the distribution panel 11 is furthermore removably connected to the latter, so that the front wall 13 can be displaced or repositioned relative to the distribution panel 11. In the exemplary embodiment shown in FIGS. 1 to 3, the front wall 13 is removably connected to holding sections 29 via locking elements 28, the holding sections 29 preferably being a component of the side walls 15 and 16 or a component of the base wall 17. The locking elements 28, just like the locking elements 26, are preferably in turn designed as so-called push/pull locks, the front wall 13, preferably together with the splice cassette 23 (see FIG. 3) fitted onto the front wall 13, can be displaced or repositioned relative to the distribution panel 11 after opening of the locking elements 28. Consequently, the optical waveguides can be accessed particularly easily for splice work. Due to the combined displacement of the front wall 13 with the or each splice cassette 23 attached to or fitted onto the front wall 13 it is possible to lead the optical waveguides to be connected to a relatively distant splicer, without there being risk of damage to the pigtails with prefabricated plugs.

For the purpose of the present invention, an optical waveguide distribution device 10 is therefore suggested, in which a splice cassette 23 or a stack of splice cassettes 23 can be displaced relative to the distribution panel 11 of the optical waveguide distribution device 10. The splice cassette 23 or the stack of splice cassettes 23 is accommodated a front wall 13 of the distribution panel 11, in this case on the front wall 13 to be displaced or repositioned relative to the distribution panel 11 together with the splice cassette 23 or the stack of splice cassettes 23. In the case of splice cassettes 23 fitted onto the front wall 13, the first optical waveguides prefabricated with connectors and running between the front wall 13 and the splice cassettes 23, remain almost completely uninfluenced by repositioning, there only being a need for the second optical waveguides, introduced via the optical cable 22, to be provided with a corresponding excess length for repositioning or displacement.

LIST OF REFERENCE SYMBOLS

10 Optical waveguide distribution device
11 Distribution panel
12 Housing
13 Front wall
14 Rear wall
15 Side wall
16 Side wall
17 Base wall
18 Guide groove
19 Coupling
20 Outer side
21 Inner side
22 Optical cable
23 Splice cassette
24 Guiding element
25 Carrier plate
26 Locking element
27 Holding element
28 Locking element
29 Holding section

The invention claimed is:
1. An optical waveguide distribution device for providing optical connectivity between optical waveguides, the device comprising:
   a housing;
   a distribution panel mounted in the housing, the distribution panel having a front wall, a base wall, side walls, and guiding elements for optical waveguides;
   a plurality of couplings positioned on the front wall of the distribution panel for plugs of first optical waveguides; and
   at least one splice cassette for placing splices between the first optical waveguides and second optical waveguides, wherein the second optical waveguides are introduced into the distribution panel via a cable,
   wherein the splice cassette, is removably connected in a first position to the distribution panel in the region of the base wall, and wherein the splice cassette is able to be moved from the first position and connected in a second position on the front wall of the distribution panel which is removably connected to the distribution panel in such a manner that the front wall can be displaced or repositioned relative to the distribution panel together with the splice cassette.

2. The optical waveguide distribution device according to claim 1, wherein the splice cassette is removably connected in the first position to the base wall of the distribution panel via locking elements.

3. The optical waveguide distribution device according to claim 2, wherein the splice cassette is removably connected in the first position via the locking elements to the guiding elements for optical waveguides, said guiding elements being positioned on the base wall of the distribution panel and delimit an excess length store.

4. The optical waveguide distribution device according to claim 2 wherein the front wall of the distribution panel has holding elements on a top edge in order to accommodate the splice cassette when the splice cassette is moved to the second position.

5. The optical waveguide distribution device according to claim 4, wherein the locking elements interact with the holding elements positioned in the region of the top edge of the front wall of the distribution panel, in order to accommodate each splice cassette on the front wall of the distribution panel.

6. The optical waveguide distribution device according to claim 5 wherein the front wall is removably connected to at least one of the side wall and a base wall of the distribution panel via locking elements.

7. The optical waveguide distribution device according to claim 6 wherein the splice cassette is stored on a carrier plate, it being possible for the splice cassette together with the carrier plate to be displaced or repositioned relative to the distribution panel.

8. The optical waveguide distribution device according to claim 7 wherein the locking elements are assigned to the carrier plate.

9. The optical waveguide device according to claim 1, wherein the distribution panel is mounted in a tray-like manner in the housing.

* * * * *